(12) United States Patent
Cochran et al.

(10) Patent No.: US 7,293,048 B2
(45) Date of Patent: Nov. 6, 2007

(54) SYSTEM FOR PRESERVING LOGICAL OBJECT INTEGRITY WITHIN A REMOTE MIRROR CACHE

(75) Inventors: Robert Cochran, Roseville, CA (US); David Robinson, Loomis, CA (US); Joseph Algieri, Santa Clara, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 497 days.

(21) Appl. No.: 10/697,820

(22) Filed: Oct. 29, 2003

(65) Prior Publication Data
US 2005/0102553 A1    May 12, 2005

(51) Int. Cl.
G06F 17/30    (2006.01)
G06F 7/00    (2006.01)

(52) U.S. Cl. .................. 707/204; 707/101; 707/10

(58) Field of Classification Search .............. 707/204, 707/10, 101
See application file for complete search history.

(56) References Cited

U.S. PATENT DOCUMENTS

| | | | |
|---|---|---|---|
| 6,052,797 A | 4/2000 | Ofek et al. | |
| 6,502,205 B1 | 12/2002 | Yanai et al. | |
| 6,529,944 B1 | 3/2003 | LeCrone | |
| 6,636,908 B1 * | 10/2003 | Winokur et al. | 710/29 |
| 6,735,636 B1 * | 5/2004 | Mokryn et al. | 710/5 |
| 2004/0230859 A1 * | 11/2004 | Cochran et al. | 714/2 |

OTHER PUBLICATIONS

Baird: Oracle 8i Data Guard Concepts, Administration, and Installation Guide, Release 3.0, Oct. 2001, Oracle® (previously provided).*
Bobrowski et al.: Oracle7™ Server Concepts, Release 7.3, Feb. 1996, Oracle® (previously provided).*
Baird: Oracle 8i Data Guard Concepts, Administration, and Installation Guide, Release 3.0, Oct. 2001, Oracle®.*
Bobrowski et al.: Oracle7™ Server Concepts, Release 7.3, Feb. 1996, Oracle®.*

* cited by examiner

Primary Examiner—Kuen S. Lu

(57) ABSTRACT

A database system is capable of executing a database application that transfers a logical object in multiple fragments. The database system comprises a main storage site, a remote storage site, a main protocol executable on the main storage site, and a remote protocol executable on the remote storage site. The remote storage site is capable of linking to the main storage site and mirroring information stored in the main storage site. The remote storage site includes a storage and a cache sidefile divided into a plurality of array sidefile recordsets. The main protocol is capable of including information indicative of logical object fragment commencement and completion in the multiple fragment database application transfer. The remote protocol is capable of controlling the cache sidefile to cache the multiple fragments as received and to enable destaging of the logical object to the storage on receipt of all fragments.

30 Claims, 6 Drawing Sheets

SYSTEM FOR PRESERVING LOGICAL OBJECT INTEGRITY WITHIN A REMOTE MIRROR CACHE

BACKGROUND OF THE INVENTION

An application database may use data in groups or chunks, in some conventions called a page, in a particular minimum quantity that represents a viable logical object within the database. Tasks of a database include management and storage of large quantities of data, accessing and writing of data in appropriately fast times, and maintaining data integrity. A database generally includes primary and secondary storage sites for respectively storing main or original data, and replicated data on a remote mirror site. The replicated and stored mirror data can be accessed for backup and disaster recovery to enable fast and accurate system recovery. Once redundant operations are established by way of block-level disk array replication, the database has the benefit of duplicate data copies. During normal operations, primary volumes remain online to all hosts and process both read and write input/output (I/O) operations. In the event of a disaster or system failure, a secondary data copy can be quickly invoked to enable recovery with high data integrity.

When the system recovers data from the remote disk array mirror site, data base integrity is only ensured when data pages are fully present. Otherwise, the database cannot successfully start. Generally, a database starts by generating a call to open the database, scanning the storage media, allocating physical memory and executable processes to handle I/O operations, and opening control files that contain information coordinating data and log files and indicating file status. The startup process also includes opening the files identified by the control files. If some files are incomplete, linkages between files are missing and the database is unable to start. Incomplete transfer of a replicated page to the mirror site can result in a partial transfer of a page, termed a "torn page." Some databases may fail to handle the torn page phenomenon and attempt to use the incomplete page at startup, possibly resulting in an abortive startup or data corruption.

Referring to FIG. 1, a schematic block diagram illustrates a torn application page phenomenon and handling by a server, such as Microsoft™ SQL Server, that may result in faulty startup or data corruption. In an example of a common transaction, a host application 102 executing in a primary site 100 performs a large write operation, for example an 80 KByte write, using an 8 K/1 K file system 104. For a storage that is used in a virtual mode, the 8 K/1 K file system 104 performs any write operation larger than 8 KBytes by dividing the data into individual 8 KByte blocks, transparent to the host application 102, and transferring the blocks separately. If fewer than 8 Kbytes remain after the division, the 8 K/1 K file system 104 sends the remaining data in 1 KByte blocks. Alternatively, the storage can be used in a physical or raw mode. In virtual mode operations, the 8 K/1 K file system 104 handles a large application write which represents a single application page by transparently breaking the page into multiple fragments. In a relatively unsophisticated server, the receiving storage array has no way to determine or identify whether all pages have been received in a transfer, making the system susceptible to the problem of a torn page at a receiving array for any write that is larger than the file system block size.

In the illustrative example, the 8 K/1 K file system 104 divides the 80 KByte write into ten individual 8 KByte write operations and transfers the ten 8 KByte blocks into a Primary Storage 106. A mirroring link 108 transfers the individual blocks to a remote storage array or storage mirror 110 for replicated storage. A sophisticated application, for example a Veritas™ file system or Oracle™ database can use a combination of an intent log, the data write, and a commit signal to resolve the torn page problem. For example, a file system can use the intent log, a circular activity log containing records of intention of the system to update a structure, to ensure integrity. The intent log records pending changes to file system structure and ensures log records are written in advance of changes to the system. In the case of system failure, pending changes in the file system are either nullified or completed. Normally, the intent file records only changes to the file system structure and not file data changes. A less sophisticated application such as the Microsoft™ SQL Server simply sends the application data page and assumes or hopes that the page is intact at the remote array 110 at the time of a failover.

As shown in FIG. 1, an 80 KByte application page disk write may be transparently divided into ten 8 KByte fragments by the 8 K/1 K file system 104 written to the primary storage 106 and mirrored to arrays in the remote storage 110. If a disaster occurs at the primary site 100 before the remote array 110 receives and destages to disk 112 all ten of the fragments, then an error may result on application startup of the remote array 110. For example, even if nine of the ten fragment writes that make up the application page had been correctly received and destaged to disk 112, the remote array 110 would contain an incomplete or torn application page. An unsophisticated application may designate the torn page as a corrupted and unusable database and refuse startup, possibly nullifying an implemented disaster recovery response or plan.

In a particular example, a Microsoft SQL Server™ used with various Windows™ operating systems use data pages with inconsistent sizes. As a result, a corrupted database is a possible consequence of a power failure, disk driver or physical disk difficulties, or other disaster. Corruption can occur because each time the operating system writes an 8 KByte SQL Server data page, the page is broken into 512 byte pages. After the first 512 bytes of data are written, SQL Server assumes the entire 8 Kbytes have written to disk successfully. If power or other failure occurs before all 512 byte pages are written to disk, the SQL Server cannot detect the failure. The condition is the described "torn page." Corruption of a single data page, due to lack of information narrowing the extent of corruption, renders the entire database corrupt. SQL Server attempts to limit resulting damage through usage of "torn page detection" that can be enabled to identify torn pages. Torn page detection does not prevent corruption but only marks the database as corrupt, so that the database can be restored with the latest backup, unfortunately resulting in downtime and productivity loss for lost data generated since the last backup.

SUMMARY

What is desired is a method for preserving logical object integrity in a remote mirror cache.

According to some embodiments, a database system is capable of executing a database application that transfers a logical object in multiple fragments. The database system comprises a main storage site, a remote storage site, a main protocol executable on the main storage site, and a remote protocol executable on the remote storage site. The remote storage site is capable of linking to the main storage site and mirroring information stored in the main storage site. The remote storage site includes a storage and a cache sidefile divided into a plurality of array sidefile recordsets. The main protocol is capable of including information indicative of logical object fragment commencement and completion in the multiple fragment database application transfer. The remote protocol is capable of controlling the cache sidefile to cache the multiple fragments as received and to enable destaging of the logical object to the storage only on receipt of all fragments.

BRIEF DESCRIPTION OF THE DRAWINGS

Embodiments of the invention relating to both structure and method of operation, may best be understood by referring to the following description and accompanying drawings.

DETAILED DESCRIPTION

Figure 1:
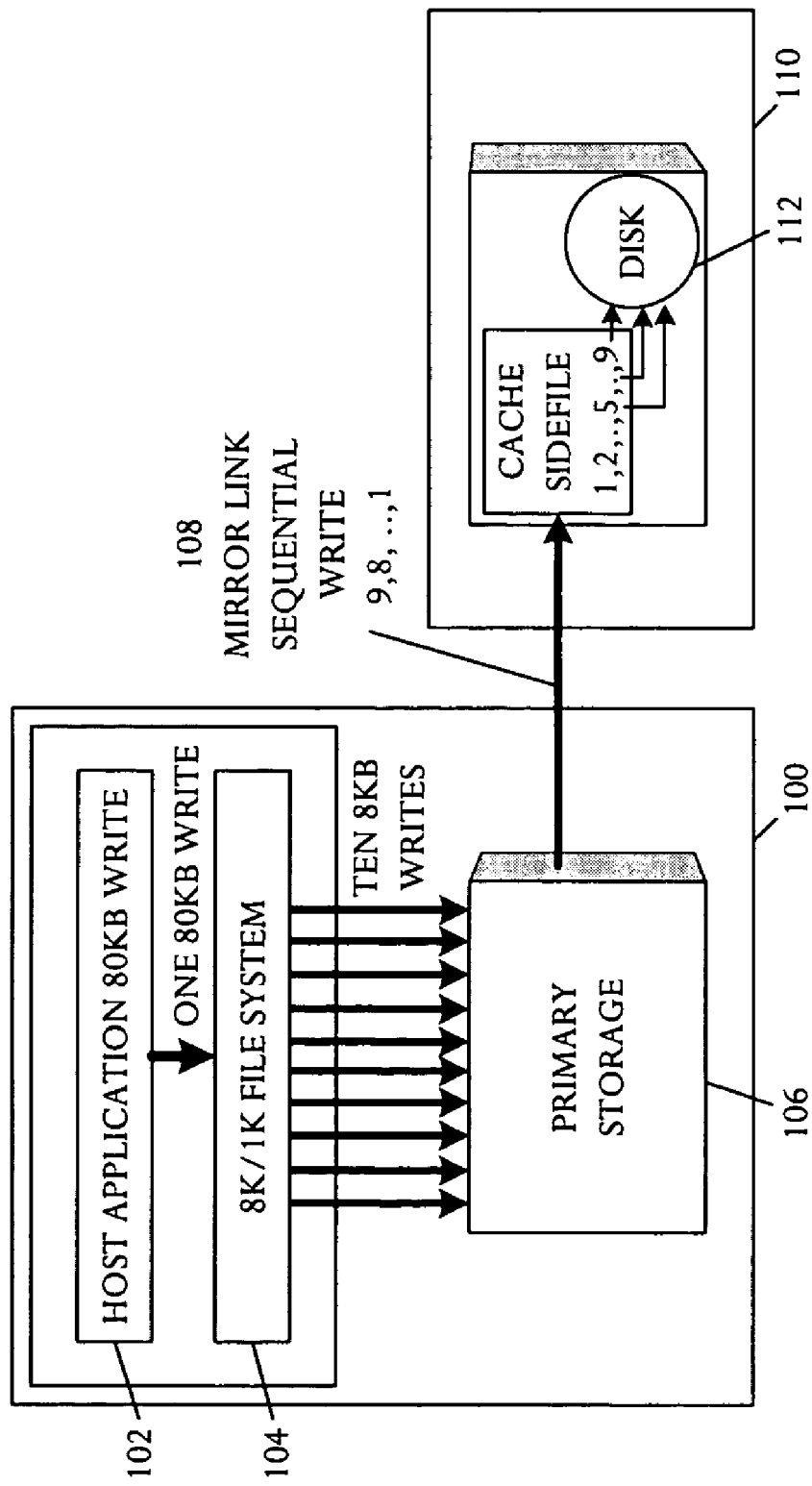
FIG. 1 is a schematic block diagram that illustrates an example of the torn application page phenomenon and handling by a server, such as Microsoft™ SQL Server, that may result in faulty startup or data corruption.
Figure 2:
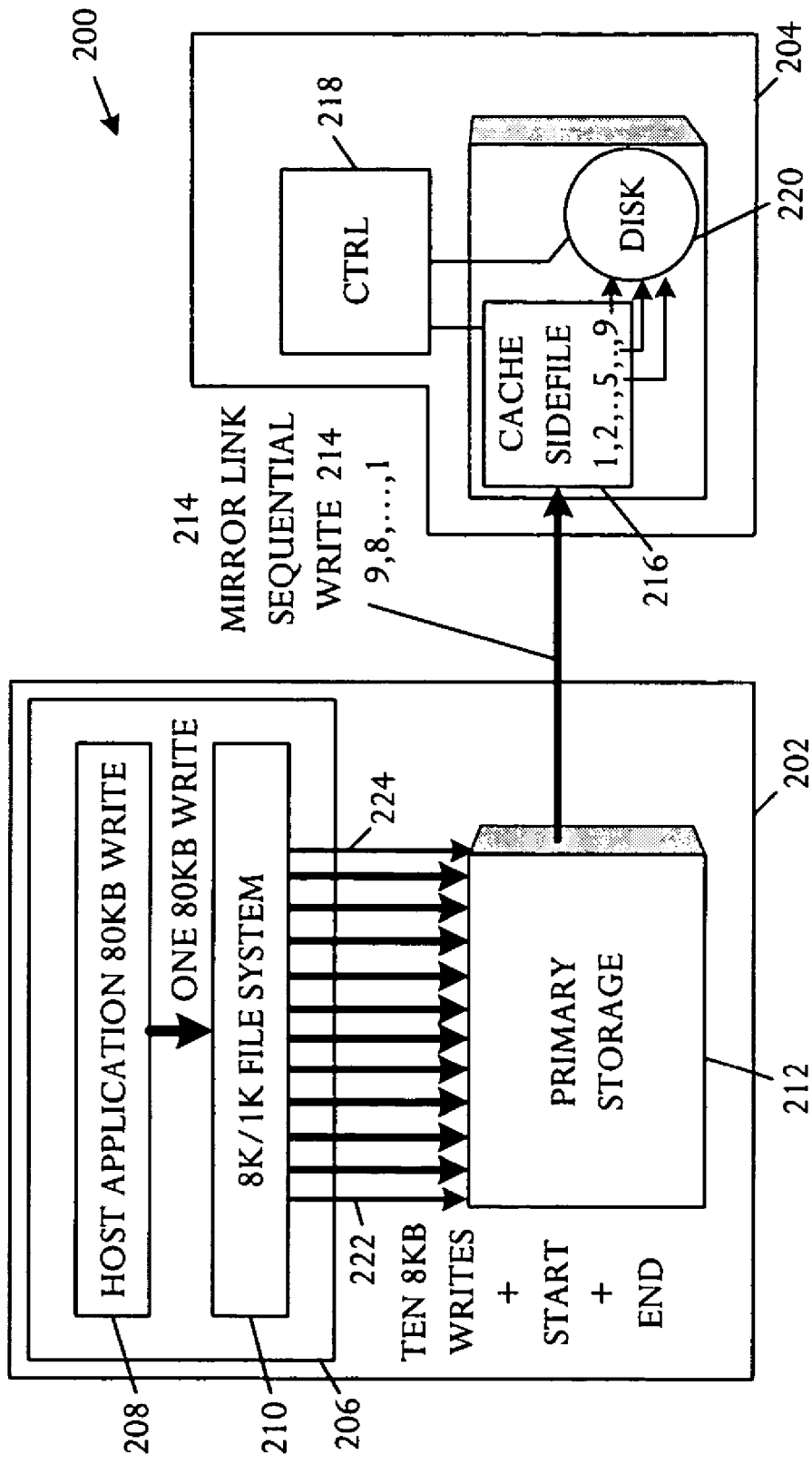
FIG. 2 is a schematic pictorial diagram showing an embodiment of a system and method for handling torn page phenomena.

Referring to FIG. 2, a schematic pictorial diagram illustrates an embodiment of a system and method for handling torn page phenomena. A database system 200 includes a plurality of storage sites, shown in the example as a main storage site 202 and a remote storage site 204. The main storage site 202 includes a controller 206 that is capable of executing programs, processes, methods, and other types of executable systems, often as a computable readable program code. The database system 200 can execute a host application, such as a database application 208 that transfers a logical object, for example a page, in multiple fragments. A page can be any coherent piece of data, any type of logical record or internal grouping of data. A page may be a transitional entity such as any atomic grouping of data.

The database system 200 also includes a file system 210, illustratively shown again as an 8 K/1 K file system that receives an entire logical object from the database application 208 and divides or breaks the logical object to multiple fragments for transfer to a primary storage 212. The database system 200 also includes a mirroring link 214 for mirroring the individual fragments to the remote storage site 204 from the main storage site 202.

The remote storage site 204 generally also includes a controller 218, a cache sidefile 218, and a secondary storage 220, such as a disk storage. The controller 218 manages handling of the data fragments in the cache sidefile 216, and writing or destaging of the data fragments to the secondary or mirrored storage 220.

An illustrative system and method for preserving logical object integrity in a remote mirror cache can operate by defining and implementing an application page within the mirrored array cache sidefile 218. The cache sidefile 216 has a plurality of receiving array sidefile recordsets, a data structure that receives data from mirrored write input/output operations. The database system 200 includes a main protocol, such as a host control protocol, generally executable at the main storage site 202 that enables the host database application 208 to alert the cache sidefile array to the beginning and end of an application data page or other logical object. The main protocol can include information indicative of logical object fragment commencement and completion in the multiple fragment database application transfer in various forms such as explicitly sending start and end signals or by carrying information for implicitly determining the bounds. In one example, a "start-page" control message 222 can be sent from the file system 210 to the primary storage 212 to signal the beginning of a logical object or page transmission. An "end-page" control message 224, for example in the manner of a database commit, can delineate the end of transmission of the page or logical object.

The database system 200 also includes a remote protocol executable on the remote storage site 204 that uses the logical object beginning and end information to control the receiving mirrored array in the cache sidefile 216. The remote protocol controls the cache sidefile 216 to cache the multiple fragments when received and to destage or write the fragments to mirror storage 220 when the entire page has been received and is available in the cache sidefile 216. The remote protocol prevents destaging until all fragments are ready and contained within the cache sidefile 216 so that a storage does not contain incomplete or torn pages.

In various embodiments, the database system 200 can write the fragments to storage including the primary storage 212 and secondary or mirror storage 220 in any appropriate manner such as in-band or out-of-band, and using any standard, for example Small Computer Systems Interface (SCSI) writes appended with control instructions, or other techniques. In various embodiments, the communications can be custom or vendor unique.

Figure 3:
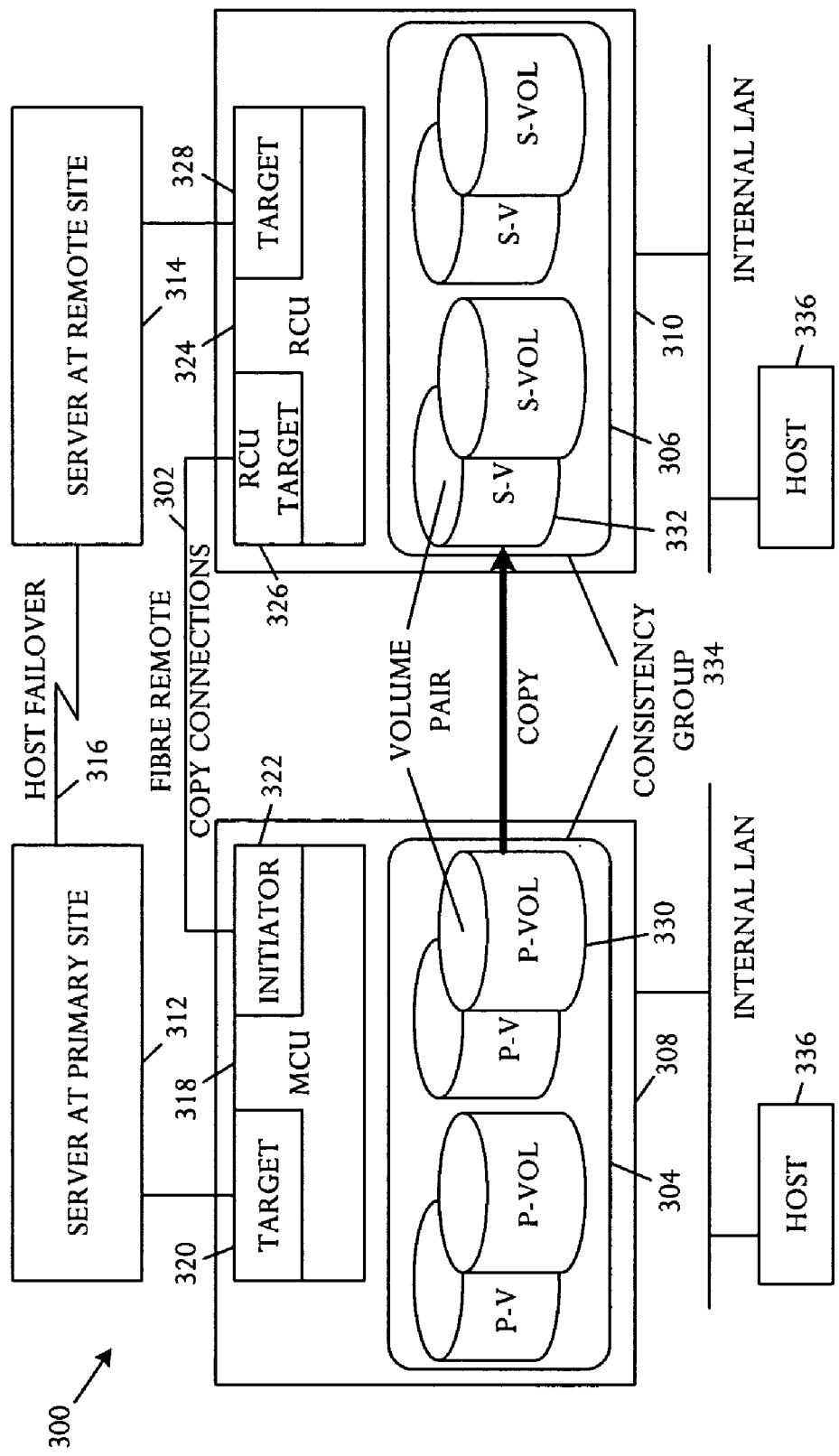
FIG. 3 is a schematic block diagram depicting an example of a database system based on a Fibre Channel connection that can be used to implement the illustrative remote mirror torn-page de-commit technique.

Referring to FIG. 3, a schematic block diagram shows an example of a database system 300 based on a Fibre Channel connection 302. Database system operations have a continuous access capability to store information in disk arrays 304 and 306 at respective primary 308 and secondary 310 sites via physical communication paths 302. A server 312 at the primary or main site 308 includes functional operating program code that controls access and transfer in the database system 300. A server 314 at the secondary, remote, or mirror site 310 also executes database control operations. In an illustrative example, continuous access program code copies original online data at the primary site 308 to offside volumes 306 at the secondary or remote site 310 via dedicated Fibre Channel connections 302. The system 300 includes a host failover communication link 316 to perform disaster recover operations.

In addition to the disk arrays 304, the primary site 308 includes a main control unit 318, and one or more target ports 320 and initiator ports 322. Similarly, the secondary site 310 has a remote control unit 324, and one or more target ports 326 and target ports 328. The disk arrays 304 and 306 are arranged in volume pairs with primary volumes (P-VOLs) 330 and secondary volumes (S-VOLs) 332 that can be arranged in asynchronous consistency groups 334.

Continuous access operations are executed in the main control unit 318 and remote control unit 324 and involve primary or main disk arrays 304 and secondary or remote disk arrays 306. The main control unit 318 contains primary volumes 330 that hold original data and are under pair management control by operation of host systems 312. The remote control unit 324 contains secondary volumes 332 that are synchronous or asynchronous copies of the primary volumes 330. A database control system supports control unit images and logical volumes of the disk arrays 304 and 306, as well as various physical drive options and various storage configurations, for example redundant arrays of individual disk (RAID1 and RAID5) configurations.

In an illustrative embodiment, the main control unit 318 is a controller, processor, central processing unit (CPU), or other control unit, in the primary disk array 304 which controls primary volumes 330 of continuous access volume pairs. Typically, a host control program that performs continuous access functionality is attached to the main control unit 318 of a primary-secondary storage pair. The main control unit 318 communicates with the remote control unit 324 via dedicated Fibre Channel 302 remote copy connections. The main control unit 318 generally controls host input/output operations to the primary volumes 330 as well as initial copy and remote copy operations between the secondary volumes 332. The main control unit 318 can also manage pair status and configuration information. The main control unit 318 can be attached via local area network to a computer or workstation 336 to assist in local and remote volume pair management control operations.

The remote control unit 324 is a control unit in the remote disk array 306 that controls secondary volumes 332 of the volume pairs. The remote control unit 324 assists the main control unit 318 in managing volume pair status and configuration. The remote control unit 324 can execute remote copy operations issued by the main control unit 318. In the illustrative method for preserving logical object integrity in a remote mirror cache, the remote control unit 324 can write control information to a sidefile and cache fragments of a logical object prior to receipt of all fragments of the page. Upon receipt of the entire page, the main control unit 318 can destage the entire logical object or page to the remote disk arrays 306. The remote control unit 324 can be attached via local area network to a computer or workstation to facilitate local and remote volume pair management control. The remote control unit 324 can also be attached to a host system 314 to enable sense information to be reported in the event of a problem or disaster condition relating to a secondary volume or remote disk array and to assist disaster recovery.

The main control unit 318 and remote control unit 324 can be defined individually and separately for different volume pairs. For example, a particular control unit can function simultaneously as an main control unit for one or more primary volumes and as a remote control unit for one or more secondary volumes, so long as remote copy connections and Fibre Channel ports are appropriately configured.

The database system 300 can perform remote copy operations for logical volume pairs created by a user. A volume pair includes one primary volume 330 and one secondary volume 332, which can be located in the same disk array for a synchronous data replication system or in different disk arrays for either synchronous or asynchronous systems. The primary volumes 330 contain original data. The secondary volumes 332 are mirrored volumes containing replicated or duplicated data.

The database system 300 can download a computable readable program code from an article of manufacture such as a controller usable medium including magnetic media, signals received over a communication link, and others that perform control operations. The computable readable program code can implement functionality such as a database application for mirroring a logical object in multiple fragments from a main storage site to a remote storage site. In a particular embodiment, the code includes a process capable of causing a controller to interface with a database application that links and mirrors data between the primary 304 and secondary 306 disk arrays. The code can also include a process that creates and deploys control information indicative of the beginning and end of a logical object to cache multiple fragments of the logical object as received and enable destaging of the fragments when all are received, otherwise destaging none of the fragments.

In another embodiment, the code can include a process for receiving the logical object in multiple fragment transfers in combination with control information indicative of the beginning and end of the entire logical object. The code further can include a process for controlling storage of the multiple fragments in a cache sidefile divided into a plurality of array sidefile recordsets, and a process that caches the multiple fragments, as received, and destages the logical object when all fragments are cached.

Executable functions such as the main protocol and the remote protocol can have various implementations. In some embodiments, the functions can be implemented as an Application Programming Interface (API) as defined according to Microsoft Windows™ standards. In a specific embodiment, the functions may include a Host API, for example a program separate from the operating system at the disk driver level that sends special write or control commands. Typically, the application calls an intermediate address translation program to translate virtual addressing to physical logical unit (LUN) addressing. In alternative embodiments, an application can use the storage or disk in raw or physical mode in a system that does not include Logical Volume Manager and File System (LVM/FS) virtual to physical address translation. A host application, for example Microsoft SQL Server™, generally calls a host resident address translation and torn page protection program (TPPP) and relays control information.

In one embodiment, the host application sends information that identifies a target storage device, and the starting address and length of an application page that is to be written. The host application requests translation of the logical address to a constituent list of physical addresses, for example in a disk array LUN. The host application also can instruct the individual physical devices, such as physical disks or disk array LUNs) to operate on the multiple associated physical writes as a single page entity such that either all of the entity is destaged to the disk at a remote site, or none of the page is destaged.

The torn page protection program resolves the application's virtual address, in some examples obscured by abstractions of the Logical Volume Manager and File System (LVM/FS), into a pick list of actual physical disk writes associated with the page. The information resolved by the torn page protection program is sent to the sending array LUN in a control message. The LVM physical volume to logical volume mapping is configured so that the complete content of the application database page does reside within a single remote disk volume.

In the illustrative example, beginning and ending bracketing control messages are used to identify start and end fragments. Other embodiments may designate the bounds in other manners. In one example, the start fragment is implied by sending the first fragment and the first fragment has an embedded code indicative of the total number of units, such as the total number of bytes or fragments. The embedded code also includes the target LUN device to receive the logical object within a specified address range. Implicit in the code is a command to automatically destage the entire logical object or page once the total number of units is received. In this manner, the code does not require an explicit end-page message or command.

Figure 4:
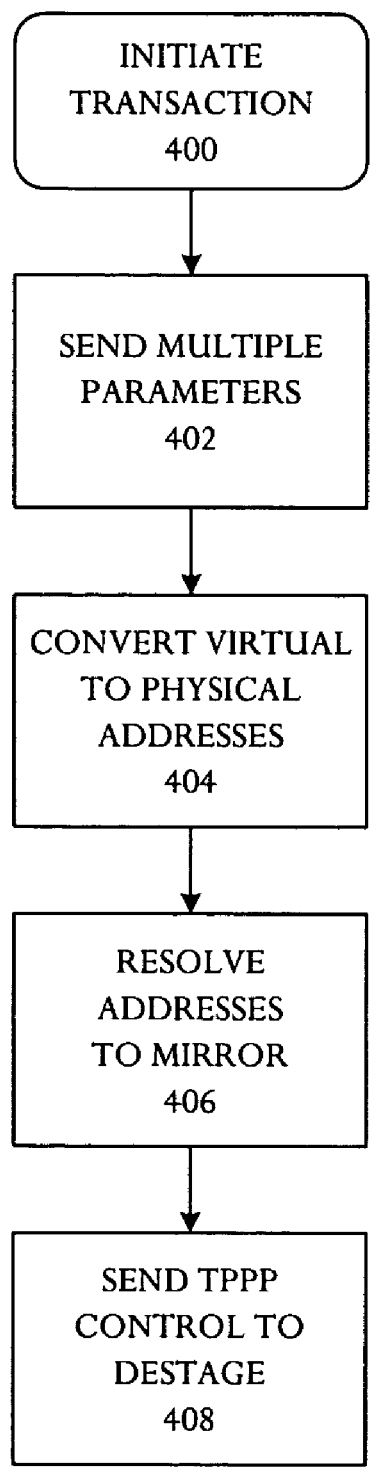
FIG. 4 is a flow chart illustrating an example of a sample dialog for communicating control signals in a manner that avoids remote storage of a torn page.

Referring to FIG. 4 in combination with FIG. 3, a flow chart illustrates an example of a sample dialog for communicating control signals in a manner that avoids remote storage of a torn page. A host initiates a transaction 400 by sending multiple parameters 402 to a torn page protection program. In a specific example, the host sends a message indicating intent to start a 32 KByte write to a virtualized storage address X. The message commands that the torn page protection program signals appropriate physical LUNs with a begin-page message. The torn page protection program uses available addressing resolution technology to convert the virtualized write address to physical addresses 404. The torn page protection program accordingly can receive an application request to write the logical object of a specified length to a specified virtualized storage address. In an example, the resolution program determines that the logical address resolves 406 to specific addresses storing 32 KBytes to each of a physical disk array LUN Y on a main storage site and a mirrored physical disk array LUN Z on a mirrored or remote storage site. The address resolution process 406 can convert the virtualized write address and resolve the transfer length to designate at least one physical address in at least one physical storage device for transferring the logical object in multiple fragments.

The torn page protection program sends a control message to all individual arrays containing disk array LUN Y and disk array LUN Z 408. Control messages from server 312 to LUN Y may be via direct connection to main control unit 318 and control messages to LUN Z may pass to remote control unit 324 by way of main control unit 318 and communication path 302. The control message expresses that the command is the start of a logical object page that is to be held at a remote mirror cache and either destaged all at once or not at all. The control message further indicates that a subsequent end-page control message is to be sent to delineate the end of the logical object to active destaging of the logical object. In this manner, the mirror cache is destaged to physical storage entirely, or alternatively, no portion of the logical object fragments is destaged.

The illustrative method for preserving logical object integrity in a remote mirror cache can be used in a system that replicates data in any appropriate manner. For example, the method can be used in a system using synchronous or asynchronous data replication between disk arrays. Similarly, the method can be used for a system with any type of linkage between arrays, for example Fibre Channel (FC), Small Computer Systems Interface (SCSI), Internet SCSI (iSCSI), Enterprise System Connection Architecture (ESCON), and other linkage standards.

Figure 5A:
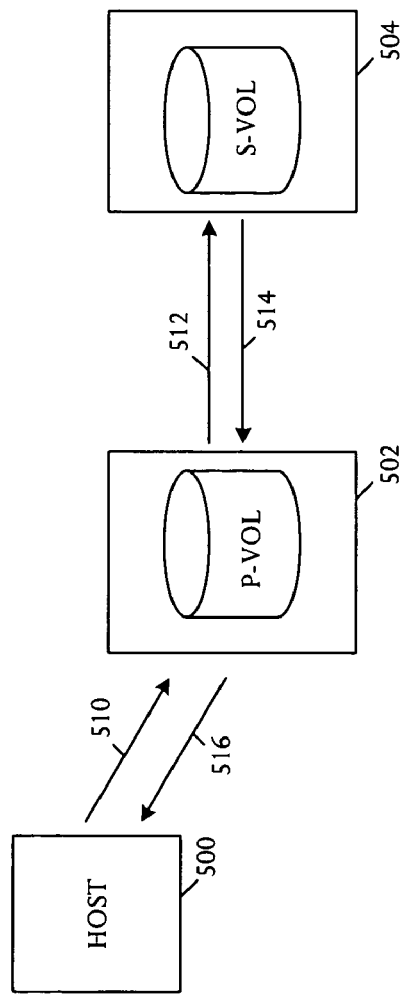
FIGS. 5A and 5B are schematic block diagrams respectively showing synchronous and asynchronous data replication techniques that are compatible with the illustrative method for preserving logical object integrity in a remote mirror cache.

Referring to FIG. 5A, a schematic block diagram illustrates a synchronous data replication method. Any input/output commands 510 issued to a primary storage array 502 from a host 500 are copied 512 to a secondary storage array 504. Once data is written in memory on the secondary array 504, the input/output is acknowledged 514 to the primary array 502 and then acknowledged 516 to the host 500. In a particular embodiment, a main control unit performs a write operation on a primary volume, starts the update copy operation on the secondary volume, and reports final ending status to a host only after results of the update copy operation are known. If either the primary volume write or the secondary volume update copy operation fails, the main control unit reports a unit check, and the host system and application program regard the write operation to the primary volume as failed. The method for preserving logical object integrity in a remote mirror cache prevents the secondary volume from containing inconsistent or incorrect data.

The illustrative example depicts a two-site data replication and is similarly extended to additional replication sites. In a two-site data replication method, the host application is responsible for data integrity. Because an input/output command is only acknowledged to the application 516 when written to both arrays 502 and 504, the application only issues the next input/output command once the first command is complete so that data is written to the secondary array 504 in order and with consistency. Synchronous replication is relatively unsuited to multiple site mirroring since each additional new site adds to the response time of the application.

Figure 5B:
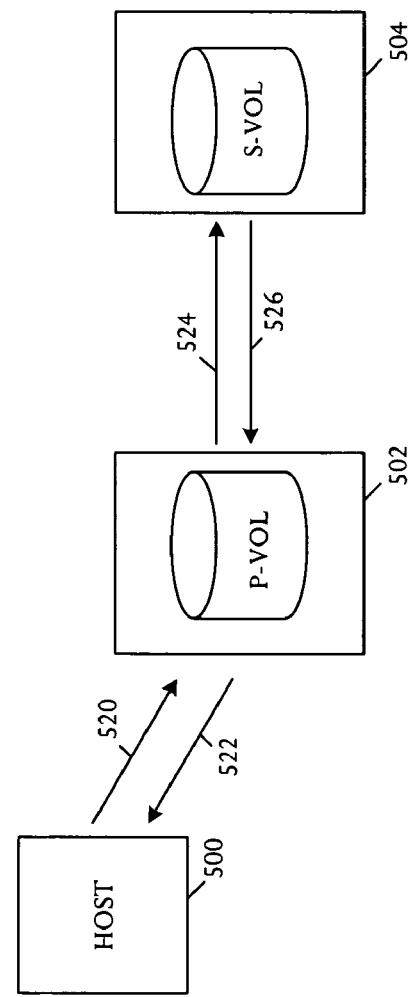

Referring to FIG. 5B, a schematic block diagram depicts an asynchronous data replication method with record ordering. An input/output command issued 520 by the host 500 to the primary storage array 502 is immediately acknowledged 522 to the host 500 as soon as the command reaches the primary storage array 502 cache. A sequence number is added to the input/output command and sent 524 to the secondary array 504. Since the path to the secondary array 504 can traverse any of multiple paths or routes, a possibility exists that the input/output commands can arrive out of order. The secondary array 504 is responsible for reordering the incoming commands according to sequence number and applying data records in the correct sequence. Management by the secondary array 504 ensures an in-order, consistent database, although the most current transactions can be lost in the event of a failure. Asynchronous data replication is better suited for long-distance replication since latency impact on the application host is reduced or eliminated.

In a particular example, the main control unit completes primary volume operations independently of the associated update copy operations at the secondary volume. The remote control unit manages the secondary volume updates according to the recordset information and maintains sequence ordered data consistency for the secondary volumes. If the primary volume write operation fails, the main control unit reports a unit check and does not create an asynchronous recordset for the operation. If the update copy operation fails, the remote control unit can optionally suspend either the affected pair or all pairs in a consistency group, depending on the type of failure. At resumption of the suspended pair, the main control unit and remote control unit can negotiate resynchronization of the pairs. The method for preserving logical object integrity in a remote mirror cache prevents an operation from leaving incorrect information on a secondary volume.

Figure 6:
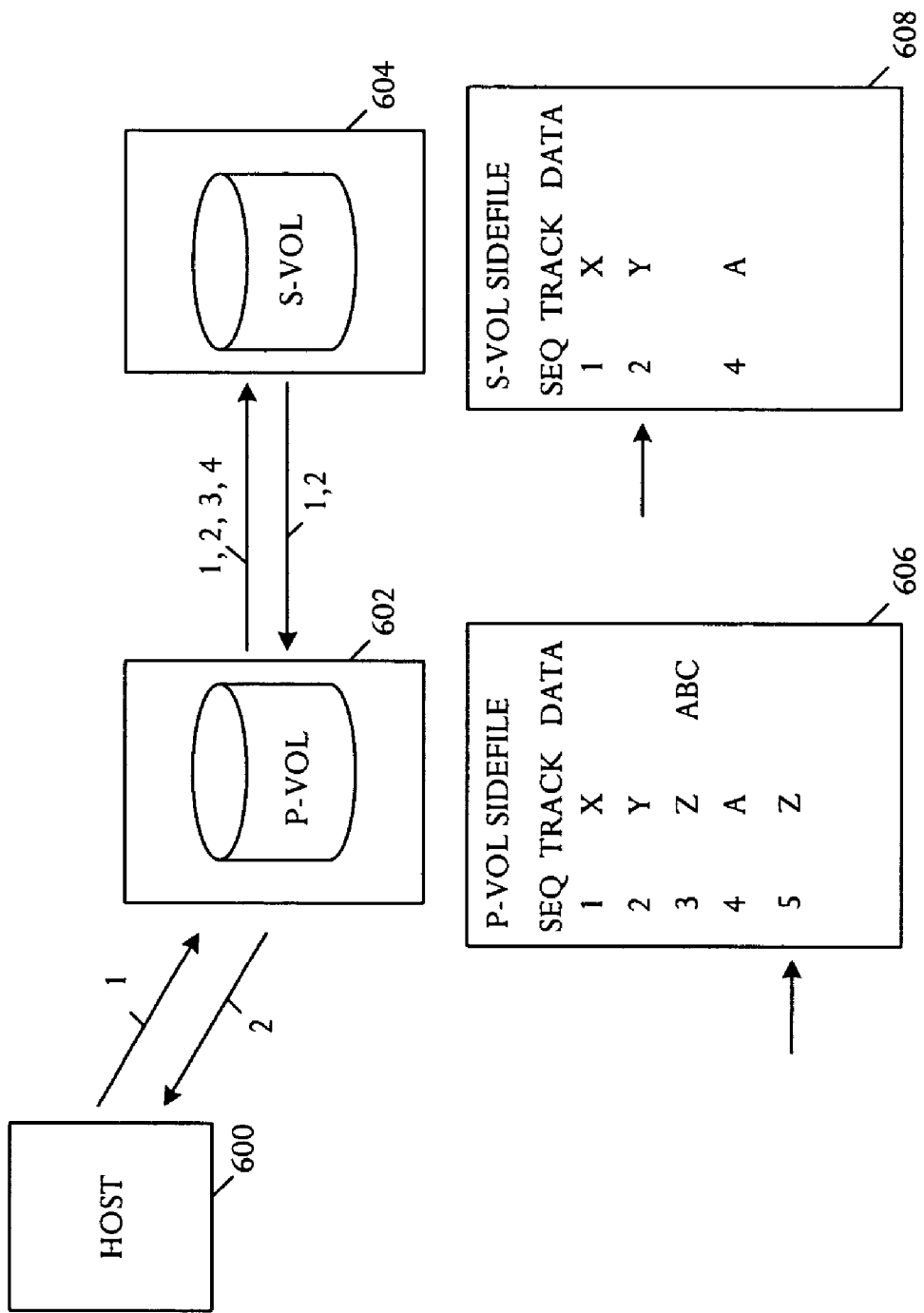
FIG. 6 is a schematic block diagram that illustrates sidefile usage in asynchronous data replication.

Referring to FIG. 6, a schematic block diagram illustrates sidefile usage in asynchronous data replication. Asynchronous replication uses sequence order tracking of update occurrence to ensure consistency. Tracking takes place in a primary volume sidefile 606 and a secondary volume sidefile 608. The individual updates are ordered with a sequence number and transmitted to the remote array 604. When the remote array 604 has received the next sequence number in the set, the remote array 604 acknowledges receipt of the data according to sequence number to the primary array 602 and the affected sequence number is removed from the primary volume sidefile list 606. If a transaction is lost between the primary array 602 and the secondary array 604, a specific sequence number's data can be requested to be retransmitted.

The sequence of numbers is managed in memory of the primary array 602 and the remote array 604 and utilizes additional resources, the sidefiles 606 and 608. For an input/output operation performed to the primary array 602, an entry is added to the sidefile 606 containing the sequence number and a pointer to the blocks affected by the update. If the same block is updated on a subsequent input/output operation, contents of the block are also recorded in the sidefile 606. The sidefile size is dependent on performance of the links to the remote array 604 against the number of input/output operations performed by the primary array 602. If the sidefile 606 reaches a predetermined percentage of the total cache memory in the array 602, for example if the input/output operations are backing up in the cache due to a slow link, the input/output rate from the host 600 is restricted in an attempt to give higher priority to the sidefile 606.

A sidefile is typically only used as long as a communication exists between the primary site 602 and the secondary site 604. If communication is disrupted, or pairs are suspended, overhead of a sidefile is considered to be too high so a bitmap is instead used to track changes, typically on a per track or per cylinder basis.

In various embodiments, the asynchronous recordsets can contain primary volume updates and associated control information, for example sequence number of the primary volume update to enable the remote control unit to maintain update consistency of the secondary volumes. Recordset operations can include creating and storing recordsets at the main control unit, sending recordsets to the remote control unit, storing recordsets in the remote control unit, and selecting and settling recordsets at the remote control unit. Other operations include controlling inflow for sidefiles.

In one example, upon a host-requested write input/output operation the main control unit performs an update and creates a recordset. The recordset can include the updated record, sequence number, record location such as device, cylinder, track, and record number, and record length. The recordsets can be queued in cache storage of the main control unit and sent to the remote control unit independent of host input/output processes. The remote control unit uses the sequence number in the recordsets to update the secondary volumes in the order of the primary volumes. The sequence number indicates the number of recordsets that the main control unit has created for each consistency group. Recordset information, other than updated records, is stored and queued in an area of cache known as sidefile cache.

In the example, the main control unit can send recordsets to the remote control unit by using main control unit initiator ports for issuing special input/output operations, called remote I/Os, to the remote control unit. The remote I/Os transfers recordsets efficiently using a single channel command so that the main control unit can send multiple recordsets in a single remote I/O call, even with noncontiguous sequence numbers. The remote control unit can store recordsets by maintaining queues to control storing of recordsets in the sidefile and committing update of records in the secondary volumes. Remote control unit queuing can use the sequence numbers to check for missing updates.

A bitmap table is an efficient technique to track changed records on a device from a particular point in time. Bit map tables record the changed track or cylinder number and typically do not maintain information concerning sequence or details of changes. If the pairs are suspended, a delta bit map table is maintained on both the primary 602 and secondary 604 arrays. Upon resynchronization of the pairs, only the changed cylinders are copied to the remote array 604, bringing the data mirror up to date. Thereafter, a sidefile is again used to continue updates. During resynchronization, data on the remote array 604 is inconsistent and unreliable.

Tracking of consistency groups is used to assure correct operation. An asynchronous consistency group is a user-defined set of volume pairs across which update sequence consistency is maintained and ensured at the remote site. Each asynchronous volume pair is assigned to a consistency group. In an illustrative system, the database system allows configuration of a predetermined number of consistency groups for each main control unit and supports group-based operations for the consistency groups. Consistency groups enable maintenance of update sequence consistency for databases that span multiple volumes, facilitating immediate database recovery at the remote site in the event of a failure or disaster.

An application commonly includes an aggregation of more than one physical device. Accordingly, correct operation can depend on assurance that all input/output activities are consistently applied to remote devices. During asynchronous operations, all devices in a device group form the same consistency group. Sequence numbers in a sidefile are issued at the consistency group granularity level so that input/output operations applied to the primary devices of that consistency group are applied to the secondary devices in the same sequence. If a device in the consistency group is not available to be updated, the entire consistency group is placed into an error state. Consistency groups are defined and controlled so that writes to all devices in the consistency group are not destaged unless all previous writes are ready. Consistency is applied to all devices in the consistency group, not simply a single LUN.

The method for preserving logical object integrity in a remote mirror cache can be used in the various remote copy operations of the database system, such as initial copy and update copy operations. An initial copy operation synchronizes the primary volumes and secondary volumes, generally independently of host processes. The initial copy typically takes place when a user adds a volume pair. When a new pair is created, the entire contents of the primary volume are copied to the secondary volume cylinder by cylinder, except for diagnostic and unassigned alternate tracks. Various database system embodiments may implement or omit usage of the method for preserving logical object integrity in a remote mirror cache for initial copy. Because initial copy generally occurs for more controlled conditions of database usage, some database system embodiments may omit the overhead associated with the method for preserving logical object integrity in a remote mirror cache for initial copy.

An update copy operation occurs when a host issues a write input/output operation to a primary volume of an established volume pair. The update copy operation duplicates the primary volume write input/output operation at the secondary volume to maintain volume pair synchrony.

Usage of the method for preserving logical object integrity in a remote mirror cache is useful in update copying to assure correct database operations.

While the present disclosure describes various embodiments, these embodiments are to be understood as illustrative and do not limit the claim scope. Many variations, modifications, additions and improvements of the described embodiments are possible. For example, those having ordinary skill in the art will readily implement the steps necessary to provide the structures and methods disclosed herein, and will understand that the process parameters, materials, and dimensions are given by way of example only. The parameters, materials, and dimensions can be varied to achieve the desired structure as well as modifications, which are within the scope of the claims. Variations and modifications of the embodiments disclosed herein may also be made while remaining within the scope of the following claims. For example, the disclosed apparatus and technique can be used in any database configuration with any appropriate number of storage elements. Although, the database system discloses magnetic disk storage elements, any appropriate type of storage technology may be implemented. The system can be implemented with various operating systems and database systems. The control elements may be implemented as software or firmware on general purpose computer systems, workstations, servers, and the like, but may be otherwise implemented on special-purpose devices and embedded systems.

What is claimed is:

1. A database system for executing a database application that transfers a logical object in multiple fragments comprising:
   a main storage site;
   a remote storage site that links to the main storage site, receives and stores mirror information from the main storage site, and comprises a storage and a cache sidefile divided into a plurality of array sidefile record-sets;
   a main protocol executing on the main storage site that transfers the logical object in multiple fragments in combination with information indicative of the logical object multiple fragments commencement and completion in a multiple fragment database application transfer comprising:
   receiving an application request to write the logical object of a specified length to a specified virtualized storage address;
   converting a virtualized write address and resolving the transfer length to designate at least one physical address in at least one physical storage device for transferring the logical object in fragments;
   sending a first control message to the at least one physical storage device identifying the start of the logical object to be held in a remote minor cache for destaging; and
   sending a second control message identifying the end of the logical object so that the mirror cache is destaged to the at least one physical storage device, no portion of the logical object multiple fragments being otherwise destaged; and
   a remote protocol executing on the remote storage site that controls the cache sidefile to cache the multiple fragments as received and to destage the logical object to the storage on receipt of all fragments.

2. The database system according to claim 1 wherein:
   the main protocol includes the information indicative of the logical object multiple fragments commencement and completion using a technique selected from among a group consisting of:
   (1) explicitly sending a start control message preceding the multiple fragments and an end control message concluding the multiple fragments, and
   (2) implicitly determining either the start control message or the the end control message.

3. The database system according to claim 1 wherein the main protocol further comprises:
   an address translation process that translates a logical address to a list of physical addresses.

4. The database system according to claim 1 wherein the main protocol further comprises: an address translation process that resolves the virtual write address of the database application into a pick list of actual physical media writes associated with the logical object.

5. The database system according to claim 1 wherein the main protocol further comprises:
   a process creating a control message for communication to the remote protocol that instructs individual physical storage elements to operate on the multiple physical writes as a single object entity so that all or none is destaged to the storage.

6. The database system according to claim 1 wherein:
   information is replicated from the main storage site to the remote storage site using a technique selected from among a group including: (1) synchronous data replication and (2) asynchronous data replication.

7. The database system according to claim 1 wherein:
   the logical object multiple fragments are destaged in all or none fashion to all devices in a consistency group.

8. An article of manufacture comprising:
   a controller readable storage medium having a computable readable program code embodied therein for executing in a database system that runs a database application for mirroring a logical object in multiple fragments from a main storage site to a remote storage site, the computable readable program code further comprising:
   a code causing the controller to interface with the database application that links and mirrors data between the main storage site and the remote storage site, the remote storage site including a storage and a cache sidefile divided into a plurality of array sidefile record-sets;
   a code causing the controller to create and deploy the logical object in multiple fragments in combination with control information indicative of the logical object multiple fragments commencement and completion in a multiple fragment database application transfer,
   wherein the control information controlling the cache sidefile to cache the multiple fragments as received and to destage the logical object to the storage on receipt of all fragments;
   a code receiving application request to write the logical object of a specified length to a specified virtualized storage address;
   a code converting a virtualized write address and resolving the transfer length to designate at least one physical address in at least one physical storage device for transferring the logical object in fragments;
   a code sending a first control message to the at least one physical storage device that delineates the start of the logical object that is to be held in a remote mirror cache for destaging; and
   a code sending a second control message that delineates the end of the logical object so that the mirror cache is destaged to the at least one physical storage device, no portion of the logical object multiple fragments being otherwise destaged.

9. The article of manufacture according to claim 8 wherein the computer readable program code further comprises:
a code creating control information indicative of the logical object multiple fragments commencement and completion using a technique selected from among a group consisting of:
(1) explicitly sending a start control message preceding the multiple fragments and an end control message concluding the multiple fragments, and
(2) implicitly determining either the start control message or the end control message.

10. The article of manufacture according to claim 8 wherein the computer readable program code further comprises:
a code translating a logical address to a list of physical addresses.

11. The article of manufacture according to claim 8 wherein the computer readable program code further comprises:
a code resolving the virtualized write address of the database application into a pick list of actual physical media writes associated with the logical object.

12. The article of manufacture according to claim 8 wherein the computer readable program code further comprises:
a code creating a control message for communication to the remote protocol that instructs individual physical storage elements to operate on the multiple physical writes as a single object entity so that all or none is destaged to the storage.

13. The article of manufacture according to claim 8 wherein the computer readable program code further comprises:
a code replicating information from the main storage site to the remote storage site using a technique selected from among a group including:
(1) synchronous data replication and
(2) asynchronous data replication.

14. The article of manufacture according to claim 8 wherein the computer readable program code further comprises:
a code destaging the logical object multiple fragments in all or none fashion to all devices in a consistency group.

15. An article of manufacture comprising a controller readable storage medium having a computer readable program code embodied therein for executing in a database system that runs a database application for mirroring a logical object in multiple fragments from a train storage site to a remote storage site, the computable readable program code further comprising:
a code that executes at the remote storage site causing the controller to receive the logical object in multiple fragment transfers in combination with control information indicative of the logical object multiple fragment commencement and completion;
a code that executes at the remote storage site causing the controller to control storage of the logical object multiple fragments in a cache sidefile divided into a plurality of array sidefile recordsets;
a code that executes at the remote storage site causing the controller to receive first and second control messages from a main storage site identifying respective start and end of the logical object; and
a code that executes at the remote storage site causing the controller to cache the multiple fragments as received and to destage the logical object to the storage on receipt of all fragments according to the first and second control messages.

16. The article of manufacture according to claim 15 wherein the computer readable program code further comprises:
a code determining the logical object multiple fragments commencement and completion using a technique selected from among a group consisting of:
(1) receiving explicitly identified staring and ending fragments, and
(2) deriving either of the starting fragment and the ending fragment implicitly from received control information.

17. The article of manufacture according to claim 15 wherein the computer readable program code further comprises:
a code causing the controller to track order of fragment updating between the main storage site and the remote storage site including updating of the sidefile recordsets.

18. The article of manufacture according to claim 15 wherein the computer readable program code further comprises:
a code replicating information from the main storage site to the remote storage site using a technique selected from among a group including:
(1) synchronous data replication and
(2) asynchronous data replication.

19. The article of manufacture according to claim 15 wherein the computer readable program code further comprises:
a code destaging the logical object multiple fragments in all or none fashion to all devices in a consistency group.

20. A controller readable storage element tangibly embodying a program of instructions therein that the controller executes to perform method acts for executing in a database system that runs a database application for mirroring a logical object in multiple fragments from a main storage site to a remote storage site, the method acts comprising: receiving the logical object at the remote storage site in multiple fragment transfers in combination with control information indicative of the logical object multiple fragments commencement and completion;
controlling storage of the logical object multiple fragments at the remote storage site in a cache sidefile divided into a plurality of array sidefile recordsets;
receiving at the remote storage site first and second control messages from a main storage site identifying respective start and end of the logical object;
caching the multiple fragments at the remote storage site as received; and
destaging the logical object at the remote storage site to the storage on receipt of all fragments according to the first and second control messages.

21. The storage element according to claim 20 wherein the method acts further comprise:
creating control information indicative of logical object fragment commencement and completion using a technique selected from among a group consisting of: (1) explicitly identifying starting and ending fragments, and (2) implicitly indicating either of the starting fragment and the ending fragment.

22. The storage element according to claim 20 wherein the method acts further comprise:

resolving a virtual write address of the database application into a pick list of actual physical media writes associated with the logical object.

23. The storage element according to claim 20 wherein the method acts further comprise:

creating a control message for communication to the remote protocol that instructs individual physical storage elements to operate on the multiple physical writes as a single object entity so that all or none is destaged to the storage.

24. The storage element according to claim 20 wherein the method acts further comprise:

receiving at the main storage site an application request to write the logical object of a specified length to a specified virtualized storage address;

converting at the main storage site the virtualized write address and resolving the transfer length to designate at least one physical address in at least one physical storage device for transferring the logical object in fragments;

sending a first control message from the main storage site to the at least one physical storage device that delineates the start of a logical object that is to be held in a remote mirror cache for destaging; and sending a second control message that delineates the end of the logical object so that the mirror cache is destaged to the at least one physical storage device, no portion of the logical object fragments being otherwise destaged.

25. The storage element according to claim 20 wherein the method acts further comprise:

replicating information from the main storage site to the remote storage site using a technique selected from among a group including: (1) synchronous data replication and (2) asynchronous data replication.

26. A controller readable storage element tangibly embodying a program of instructions therein that the controller executes to perform method acts for executing in a database system that runs a database application for mirroring a logical object in multiple fragments from a main storage site to a remote storage site, the method acts comprising:

interfacing with the database application that links and mirrors data between the main storage site and the remote storage site, the remote storage site including a storage and a cache sidefile divided into a plurality of array sidefile recordsets;

deploying from the main storage site the logical object in multiple fragments in combination with control information indicative of the logical object multiple fragments commencement and completion in a multiple fragment database application transfer, wherein the control information controlling the cache sidefile to cache the multiple fragments as received;

receiving an application request to write he logical object of a specified length to a specified virtualized storage address;

converting a virtualized write address and resolving the transfer length to designate, at least one physical address in at least one physical storage device for transferring the logical object in fragments;

sending a first control message to the at least one physical storage device identifying the start of a logical object To be held in a remote mirror cache for destaging;

sending a second control message identifying the end of the logical object so that the mirror cache is destaged to the at least one physical storage device, no portion of the logical object multiple fragments being otherwise destaged; and destaging at the remote storage site the logical object to the storage on receipt of all fragments according to the first and second control messages.

27. The storage element according to claim 26 wherein the method acts further comprise:

determining logical object fragment commencement and completion using a technique selected from among a group including: (1) receiving explicitly identified starting and ending fragments, and (2) deriving either of the starting fragment and the ending fragment implicitly from received control information.

28. The storage element according to claim 26 wherein the method acts further comprise:

tracking order of fragment updating between the main storage site and the remote storage site including updating of the sidefile recordsets.

29. The storage element according to claim 26 wherein the method acts further comprise:

replicating information from the main storage site to the remote storage site using a technique selected from among a group including: (1) synchronous data replication and (2) asynchronous data replication.

30. The storage element according to claim 26 wherein the method acts further comprise:

controllably destaging the logical object multiple fragments in all-or-none fashion to all devices, in a consistency group.

* * * * *

UNITED STATES PATENT AND TRADEMARK OFFICE
CERTIFICATE OF CORRECTION

PATENT NO. : 7,293,048 B2 Page 1 of 1
APPLICATION NO. : 10/697820
DATED : November 6, 2007
INVENTOR(S) : Robert Cochran et al.

It is certified that error appears in the above-identified patent and that said Letters Patent is hereby corrected as shown below:

On the title page, in field (56) under "Other Publications", in column 2, lines 1-3, delete "Baird: Oracle 8i Data Guard Concepts, Administration, and Installation Guide, Release 3.0, Oct. 2001, Oracle® (previously provided).*"

On the title page, in field (56) under "Other Publications", in column 2, lines 4-5, delete "Bobrowski et al.: Oracle7T™ Server Concepts, Release 7.3, Feb. 1996, Oracle ®. (previously provided).*"

In column 4, line 57, delete "offside" and insert -- offline --, therefor.

In column 12, line 5, Claim 2, after "or the" delete "the".

In column 14, line 13, Claim 16, delete "staring" and insert -- starting --, therefor.

In column 16, line 6, Claim 26, delete "he" and insert -- the --, therefor.

In column 16, line 15, Claim 26, delete "To" and insert -- to --, therefor.

Signed and Sealed this

Fifteenth Day of July, 2008

JON W. DUDAS
*Director of the United States Patent and Trademark Office*